(12) United States Patent
Huang et al.

(10) Patent No.: US 8,771,509 B2
(45) Date of Patent: Jul. 8, 2014

(54) PURIFYING DEVICE FOR SLUDGE UNDER WATER AND METHOD FOR OPERATING THE SAME

(75) Inventors: Chun-Ping Huang, Taoyuan County (TW); Jamie Liao, Taoyuan County (TW)

(73) Assignee: Institute of Nuclear Energy Research, Jiaan Village, Longtan, Taoyuan (TW)

( * ) Notice: Subject to any disclaimer, the term of this patent is extended or adjusted under 35 U.S.C. 154(b) by 8 days.

(21) Appl. No.: 13/437,934

(22) Filed: Apr. 3, 2012

(65) Prior Publication Data
US 2013/0256236 A1 Oct. 3, 2013

(51) Int. Cl.
*C02F 11/12* (2006.01)
*B01D 35/02* (2006.01)
*B01D 35/26* (2006.01)
*G21F 9/06* (2006.01)
*G21F 9/30* (2006.01)

(52) U.S. Cl.
USPC ........ 210/237; 210/241; 210/323.2; 210/324; 210/333.01; 210/406; 210/411; 210/416.1; 210/911; 376/313; 588/20

(58) Field of Classification Search
None
See application file for complete search history.

(56) References Cited

U.S. PATENT DOCUMENTS

| | | | | |
|---|---|---|---|---|
| 594,847 | A * | 12/1897 | Bennett et al. | 210/103 |
| 709,616 | A * | 9/1902 | Thorne | 210/237 |
| 717,912 | A * | 1/1903 | Peck | 210/318 |
| 748,088 | A * | 12/1903 | Moore | 210/237 |
| 808,924 | A * | 1/1906 | Hollis | 210/237 |
| 956,366 | A * | 4/1910 | Knock | 210/343 |
| 1,051,620 | A * | 1/1913 | Neil | 210/237 |
| 1,178,355 | A * | 4/1916 | Stein | 210/237 |
| 1,271,925 | A * | 7/1918 | Moore | 210/173 |
| 1,404,667 | A * | 1/1922 | Stevens | 210/237 |
| 1,678,704 | A * | 7/1928 | Morrison | 210/171 |
| 1,794,281 | A * | 2/1931 | Dorfner | 210/237 |
| 2,354,623 | A * | 7/1944 | Tietig | 210/237 |
| 2,442,818 | A * | 6/1948 | Lyman | 210/237 |
| 2,448,157 | A * | 8/1948 | Schneider | 210/241 |
| 2,909,285 | A * | 10/1959 | Besler | 210/232 |
| 3,935,105 | A * | 1/1976 | McEwen | 210/138 |
| 4,116,838 | A * | 9/1978 | Lazzarotto | 210/209 |
| 4,229,302 | A * | 10/1980 | Molvar | 210/220 |
| 4,527,633 | A * | 7/1985 | McLaughlin et al. | 166/370 |
| 4,546,830 | A * | 10/1985 | McLaughlin et al. | 166/370 |
| 5,243,632 | A * | 9/1993 | Badin et al. | 376/313 |
| 5,681,460 | A * | 10/1997 | Caughman, Jr. | 210/232 |
| 5,858,226 | A * | 1/1999 | Caughman, Jr. | 210/232 |
| 6,040,491 | A * | 3/2000 | Sjowall | 588/16 |
| 6,270,669 | B1 * | 8/2001 | Bauer | 210/237 |

(Continued)

*Primary Examiner* — Robert James Popovics

(57) ABSTRACT

The invention is directed to a purifying device for sludge under water and a method for operating the same. The device includes a main fixing frame having an accommodating portion assess to the outside, a hollow liquid container in the accommodating portion, wherein the liquid container is provided with a liquid-flow hole and at least a backwash hole, multiple filters on the liquid container, and a pump connected to the liquid-flow hole at the liquid container through a liquid pipeline. The method includes steps: moving the liquid container having the filters to an area having a liquid to be filtered; leading the liquid to flow into the liquid container through the filters filtering out solid particles contained in the liquid; and leading a fluid to flow into the liquid container such that the filters can be backwashed accompanying with an external cleaning device if the filters are clogged.

4 Claims, 4 Drawing Sheets

(56) References Cited

U.S. PATENT DOCUMENTS

| | | | |
|---|---|---|---|
| 6,709,586 B2* | 3/2004 | Mason | 210/237 |
| 7,211,190 B2* | 5/2007 | Kielbowicz | 210/232 |
| 7,488,426 B1* | 2/2009 | Zaiter | 210/767 |
| 7,776,223 B2* | 8/2010 | Chang et al. | 210/747.4 |
| 8,048,319 B2* | 11/2011 | Smith et al. | 210/767 |
| 8,054,932 B2* | 11/2011 | Smith et al. | 376/282 |
| 8,123,939 B2* | 2/2012 | Chu et al. | 210/232 |
| 8,333,893 B2* | 12/2012 | Chang et al. | 210/670 |
| 8,475,659 B2* | 7/2013 | Oh et al. | 210/232 |
| 8,663,469 B2* | 3/2014 | Kim et al. | 210/232 |
| 2005/0167355 A1* | 8/2005 | Kielbowicz | 210/416.1 |
| 2006/0219645 A1* | 10/2006 | Bilanin et al. | 210/791 |
| 2007/0045166 A1* | 3/2007 | Fanning et al. | 210/330 |
| 2007/0084782 A1* | 4/2007 | Smith et al. | 210/323.2 |
| 2009/0184064 A1* | 7/2009 | Zaiter | 210/767 |
| 2010/0012594 A1* | 1/2010 | Chang et al. | 210/747 |
| 2010/0025315 A1* | 2/2010 | Smith et al. | 210/232 |
| 2011/0024364 A1* | 2/2011 | Chang et al. | 210/745 |
| 2011/0084008 A1* | 4/2011 | Kielbowicz et al. | 210/137 |
| 2011/0114563 A1* | 5/2011 | Kane et al. | 210/662 |
| 2011/0139700 A1* | 6/2011 | Chu et al. | 210/248 |
| 2011/0215059 A1* | 9/2011 | Smith et al. | 210/806 |
| 2011/0297627 A1* | 12/2011 | Oh et al. | 210/806 |
| 2012/0037559 A1* | 2/2012 | Kim et al. | 210/323.2 |
| 2012/0037572 A1* | 2/2012 | Kim et al. | 210/767 |
| 2012/0273407 A1* | 11/2012 | Haque et al. | 210/335 |
| 2013/0256236 A1* | 10/2013 | Huang et al. | 210/744 |

\* cited by examiner

PURIFYING DEVICE FOR SLUDGE UNDER WATER AND METHOD FOR OPERATING THE SAME

BACKGROUND OF THE DISCLOSURE

1. Field of the Disclosure

The invention relates to a purifying device for sludge under water and a method for operating the same, and more particularly, to a purifying device operating in a negative pressure, having a small volume with lightweight and being easily carried and backwashed and a method for operating the same.

2. Brief Description of the Related Art

A conventional pool for cooling nuclear appliances or storing materials is caused to have radioactive solid particles, such as suspended solids or sludge deposited at a bottom of the pool, spread therein when used to wash, cut and store various radioactive materials. Accordingly, when nuclear appliances are decommissioned or washed or water is purified in a routine schedule, the radioactive solid particles are required to be filtered from the water in order that safety and accessibility of staff members can be ensured and the water in the pool has an enhanced quality. However, a current filtering device has the following drawbacks in use.

1. Currently, the filtering device with a medium or large scale is typically fixed near the pool and is caused to be difficulty in movement without any flexibility to be moved at any time to different polluted regions to be processed thereby.

2. The conventional filtering device is set on the ground, but not under the water. This leads plant areas to be occupied and is not beneficial to protection of staff members during radiation processes.

3. The conventional filtering device operates in a positive pressure such that pumps are subject to being clogged and worn out. The filtering device is required to be equipped with a pressure casing for accommodating a filter. The filtering device after processing the radioactive materials has concerns of safety and radiation protection when maintained and detached. It is possible that the solid particles enter into the inside of the filter due to pressure such that the filter is not easily backwashed.

4. It is complicated to backwash the conventional filtering device, and ways to backwash are not diversified.

5. The filter employed in the conventional filtering device is disposable such that a large amount of secondary waste is produced and is not environmentally friendly.

To sum up, the filtering device operating in a positive pressure has the above drawbacks in practice. Accordingly, it is an important issue to lead processes to be simplified with flexibility and working efficiency and to reduce radiation doses to staff members and secondary waste.

Thus, the invention is proposed to improve the drawbacks of the conventional filtering device operating in a positive pressure.

SUMMARY OF THE INVENTION

In accordance with the main objective of the invention, the invention is directed to a purifying device for sludge under water, wherein the device operates in a negative pressure such that pumps or other inner devices can be prevented from worn out and clogged and each parts have enhanced life spans.

In accordance with the second objective of the invention, the purifying device for sludge under water is not required to have a pressure casing and is caused to have a reduced weight and volume and to be easily detached under water and maintained.

In accordance with the third objective of the invention, the purifying device for sludge under water can expand the number of the filters based on demand and is caused to have enhanced filtering area and filter efficiency.

In accordance with the fourth objective of the invention, the purifying device for sludge under water can be moved on a flexible schedule in coordination with an area to be processed and thus has excellent movability. In practice, the device can be mounted in the pool and shielded by the water in the pool such that radiation doses to staff members can be reduced.

In accordance with the fifth objective of the invention, the purifying device for sludge under water is convenient due to containing the filter that can be backwashed using filtrates, air and ultrasonics.

In order to achieve the above objectives, the invention proposes a purifying device for sludge under water. The device includes a main fixing frame having an accommodating portion assess to the outside, a hollow liquid container arranged in the accommodating portion of the main fixing frame, wherein a liquid-flow hole is arranged at the liquid container, at least a filter arranged on the liquid container, wherein the filter is provided with an outer surface filtering out small particles and a filtrate discharging hole communicating with the liquid-flow hole and a backwash hole at the liquid container, and a pump connected to the liquid-flow hole at the liquid container through a liquid pipeline such that a negative pressure created from the outer surface to the filtrate discharging hole is applied to the filter.

In accordance with an embodiment, the backwash hole at the liquid container has a fluid flow therein through a backwash pipe.

In accordance with an embodiment, the fluid flowing into the liquid container through the backwash pipe comprises an air, water or filtrate.

In accordance with an embodiment, the filter apart from the liquid container is arranged with a plate-shaped pressing part leading the filter to tightly join the liquid container.

In accordance with an embodiment, multiple securing parts join the pressing part to the liquid container.

In accordance with an embodiment, the main fixing frame has multiple side flanges at a periphery thereof, wherein multiple slings for suspending the main fixing frame are fixed on the side flanges.

A method for operating a purifying device for sludge under water includes the following steps: a. moving a liquid container having a filter to an area having a liquid to be filtered so as to fix a filtering device; b. performing a filtering process comprising leading the liquid to flow into the liquid container through the filter filtering out small solid particles contained in the liquid, wherein the small solid particles are attached to a surface of the filter, using a hydraulic pressure of the area and a negative pressure created by a pump extracting a filtrate; and c. performing a filtering determining process comprising determining if small solid particles in the area are filtered out to a tolerance level, wherein performing the filtering process is repeated if small solid particles in the area are determined not to be filtered out to the tolerance level, while all of the processes is stopped if small solid particles in the area are determined to be filtered out to the tolerance level.

In accordance with an embodiment, before performing the filtering determining process, the method further includes performing a clogged-filter determining process comprising determining if the filter is clogged, wherein the filtering determining process is performed if the filter is determined not to be clogged, while the method further includes performing a filter backwashing process comprising removing the small solid particles attached to the surface of the filter if the filter is determined to be clogged.

In accordance with an embodiment, the filter backwashing process comprises moving the filter to a cleaning tank and leading a fluid in a suitable pressure to flow into the liquid container such that the small solid particles can be removed from the surface of the filter using a positive pressure created by the fluid.

In accordance with an embodiment, the filter backwashing process comprises moving the filter to a cleaning tank having an ultrasonic device and cleaning from the small solid particles attached to the surface of the filter using ultrasonic vibration.

In accordance with an embodiment, after performing the filter backwashing process, the method includes performing a backwash-liquid collecting process including leading a backwash liquid created in the filter backwashing process to flow into an external deposition collecting container and then performing a collecting process.

The accompanying drawings are included to provide a further understanding of the invention, and are incorporated as a part of this specification. The drawings illustrate embodiments of the invention and, together with the description, serve to explain the principles of the invention.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

Figure 1:
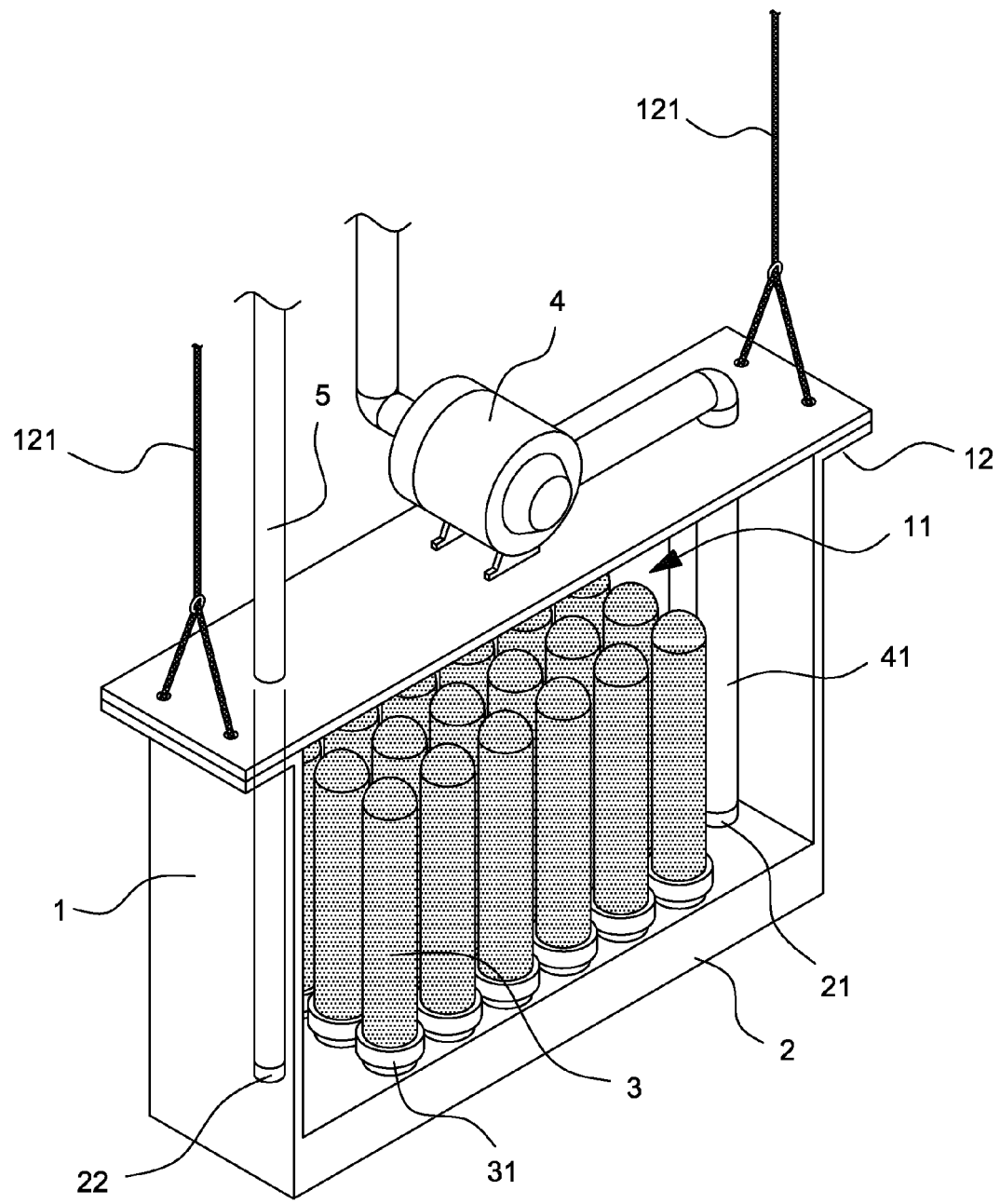
FIG. 1 is a schematic view of a filtering device and other related parts in accordance with a first embodiment of the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

Figure 2:
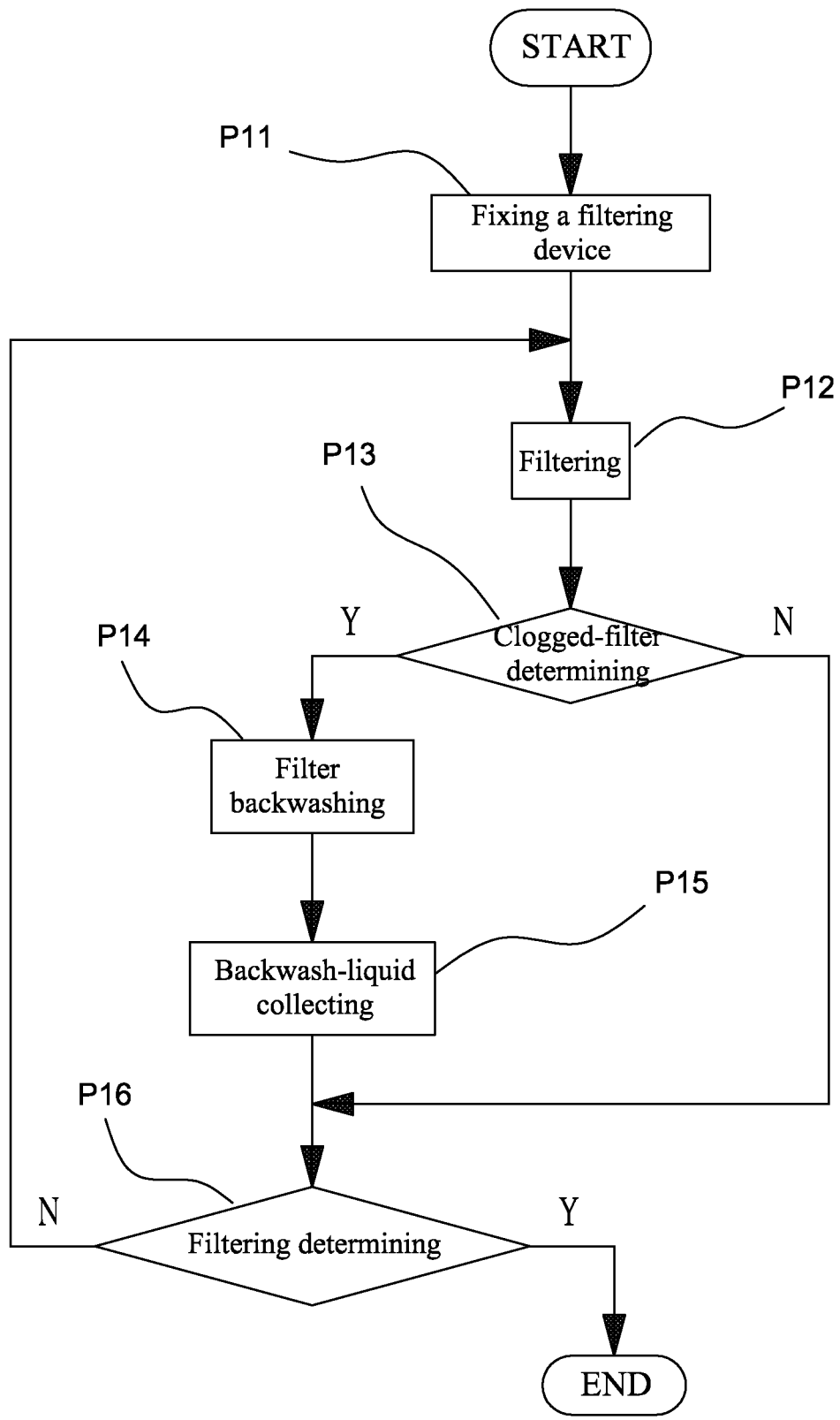
FIG. 2 is a flow chart of an operating method in accordance with the present invention.

Referring to FIGS. 1 and 2, in accordance with a first embodiment of the invention, a device mainly includes a fixing frame 1 having an accommodating portion 11 assess to the outside, wherein the main fixing frame 1 has multiple side flanges 12 at a periphery thereof, wherein multiple slings 121 for suspending the main fixing frame 1 are fixed on the side flanges 12, a hollow liquid container 2 arranged in the accommodating portion 11, wherein a liquid-flow hole 21 and at least a backwash hole 22 are arranged at the liquid container 2, filters 3 provided with outer surfaces filtering out small particles and a filtrate discharging hole 31 communicating with the inside of the liquid container 2, and a pump 4 connected to the liquid-flow hole 21 at the liquid container 2 through a liquid pipeline 41.

In accordance with a process flow of the present invention, a method for operating the above device includes the following steps. First, a step P11 of fixing a filtering device is performed by using a lifting tool to move the liquid container 2, on the main fixing frame 1, having the filters 3 to an area having a liquid to be filtered, that is, a pool containing radioactive small solid particles spread therein via the slings 121. Next, a filtering process P12 is performed by leading the liquid to flow into the liquid container 2 through surfaces of the filters 3 for filtering out the small solid particles contained in the liquid, wherein the small solid particles are attached to the surfaces of the filters 3, using a hydraulic pressure of the area and a negative pressure from the outer surface to the filtrate discharging hole 31, wherein the negative pressure is created by the pump 4 driving fluid in the liquid container 2 to be discharged. In the period when filtering process P12 is performed, a clogged-filter determining process P13 is performed comprising determining if the filters 3 are clogged, wherein the filtering determining process P12 is performed if the filters 3 are determined not to be clogged, that is, the filters 3 have a tolerant filtering capability, while a filter backwashing process P14 is performed if the filters 3 are determined to be clogged, that is, the filters 3 do not have a tolerant filtering capability, wherein the filter backwashing process P14 comprises moving clogged filters 3 to a cleaning tank having an ultrasonic device with a backwash pipe 5 joining the backwash holes 22 at the liquid container 2 so as to remove the solid particles from the surfaces of the filters 3 by a positive pressure created by leading a fluid, such as air, water or filtrate, to flow into the liquid container 2, accompanying with ultrasonic vibration created by the ultrasonic device. Thereby, backwashing the filters 3 can be performed. Next, a backwash-liquid collecting process P15 is performed comprising leading a backwash liquid created in the filter backwashing process P14 to flow into an external deposition collecting container and then performing a collecting process. Finally, a filtering determining process P16 comprises determining if solid particles in the area are filtered out to a tolerance level, wherein performing the filtering process P12 is repeated if solid particles in the area are determined not to be filtered out to the tolerance level, while all of the processes are stopped if solid particles in the area are determined to be filtered out to the tolerance level.

Figure 3:
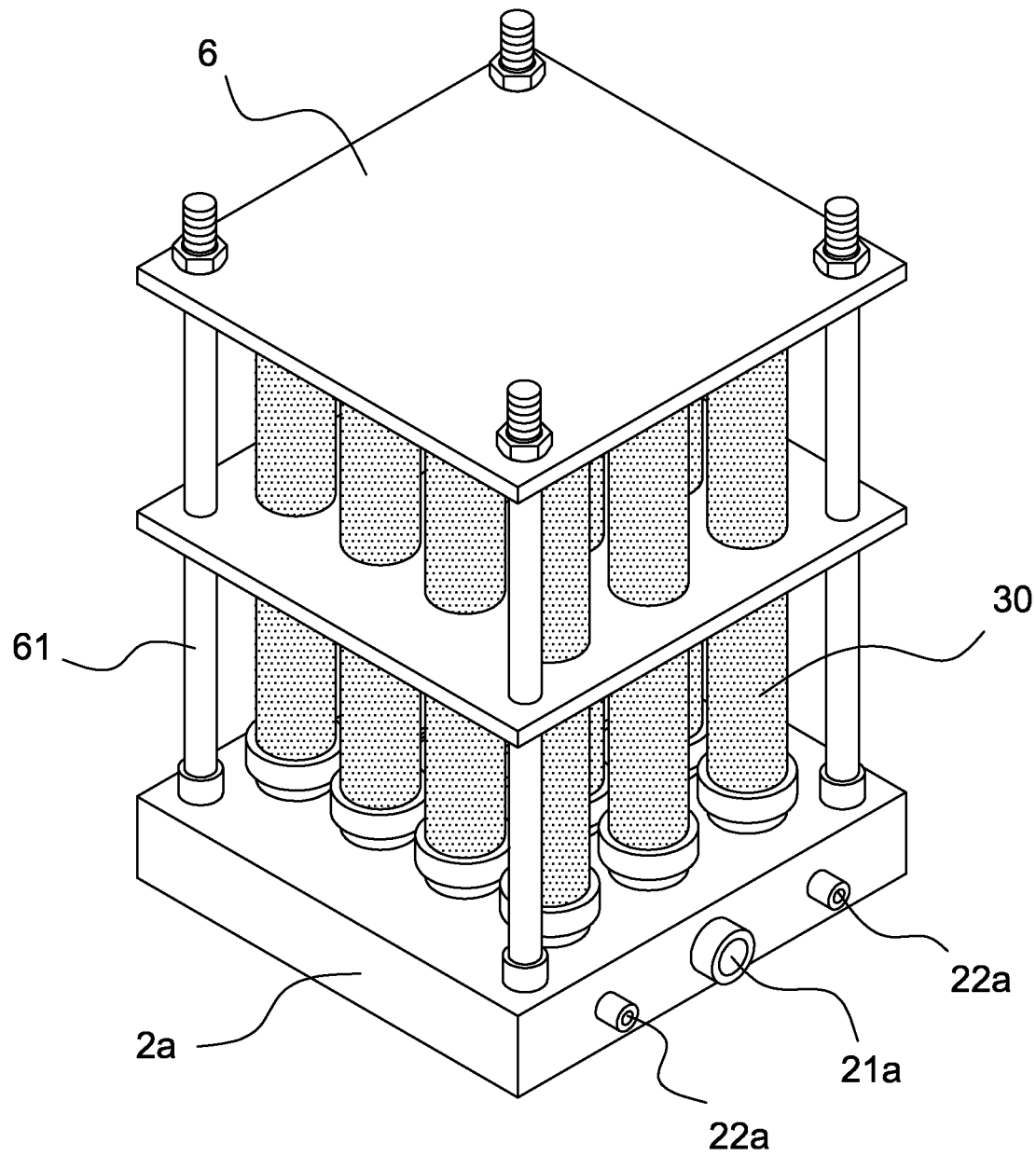
FIG. 3 is a schematic view of a filtering device in accordance with a second embodiment of the present invention.

Referring to FIG. 3, in accordance with a second embodiment of the present invention, the device comprises a hollow liquid container 2a provided with a liquid-flow hole 21a and at least a backwash hole 22a at a peripheral side thereof, and multiple filters 30 arranged at a side of the liquid container 2a, wherein the filters 30 apart from the liquid container 2a are arranged with a plate-shaped pressing part 6 having a square shape same as that of the liquid container 2a. Multiple securing parts 61 join the pressing part 6 to the liquid container 2a, and a pressure created by the pressing part 6 leads the filters 30 to join the liquid container 2a. A method for operating the device is similar to the first embodiment, and the related illustration is omitted.

Figure 4:
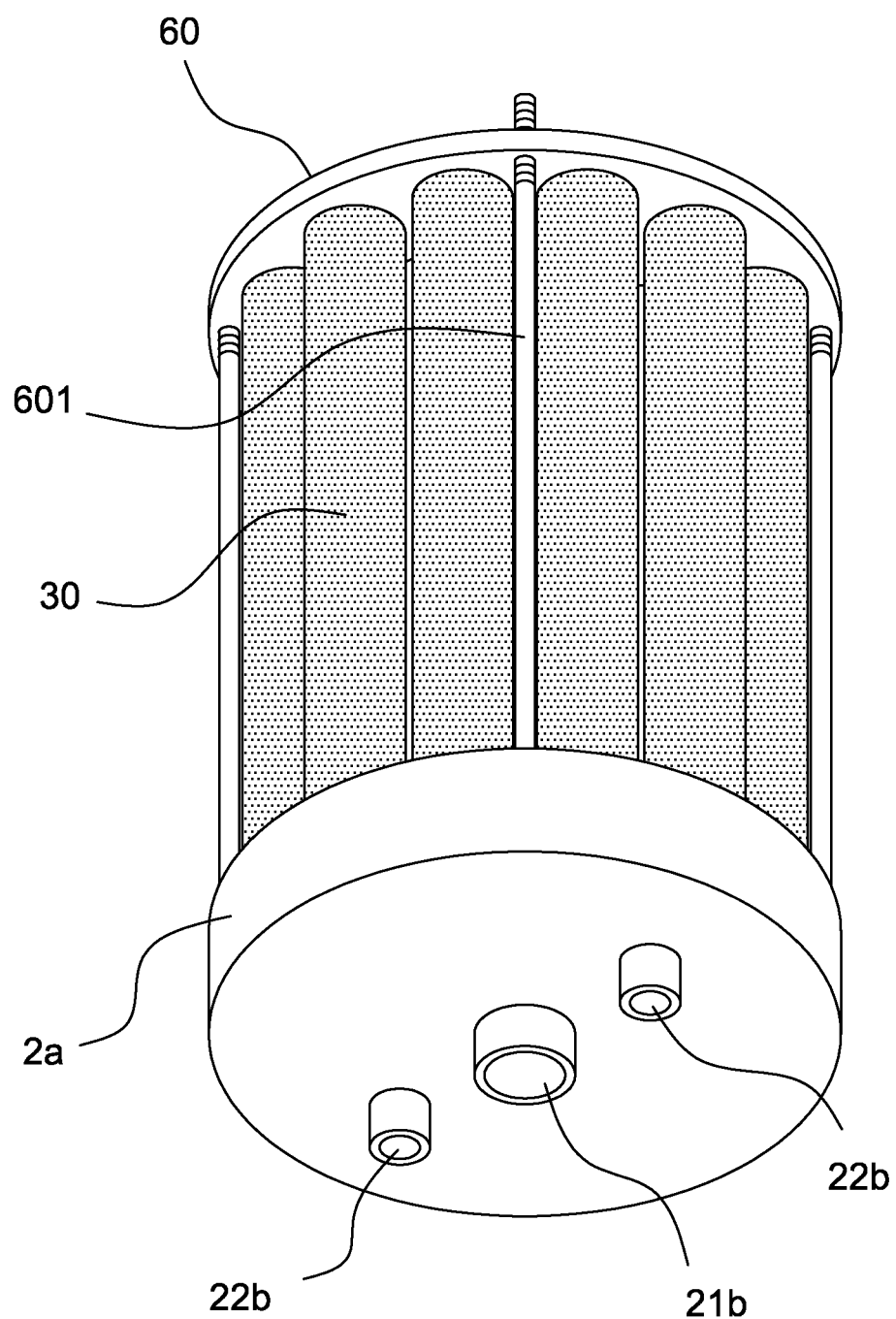
FIG. 4 is a schematic view of a filtering device in accordance with a third embodiment of the present invention.

Referring to FIG. 4, in accordance with a third embodiment of the present invention, the device comprises a round hollow liquid container 2b provided with a liquid-flow hole 21b and at least a backwash hole 22b, and multiple filters 30 arranged at a top side of the liquid container 2b, wherein the filters 30 apart from the liquid container 2b are arranged with a plate-shaped pressing part 60 having a round shape same as that of the liquid container 2b. Multiple securing parts 601 join the pressing part 60 to the liquid container 2b, and a pressure created by the pressing part 60 leads the filters 30 to join the liquid container 2b. A method for operating the device is similar to the first embodiment, and the related illustration is omitted.

In accordance with the present invention, the device and method have the following advantages:

1. The pump 4 can be fixed under water or at a side of an area or pool to be processed based on different environments and demands.

2. The number of the filters can be easily increased or reduced based on demand such that a filtering area can be altered and filter efficiency can be enhanced.

3. No pressure casing is needed, and the liquid container 2 and the filters 3 can operate under water.

4. The filters 3 and the liquid container 2 can be joined in multiple ways and the arrangement is diversified.

5. Backwashing can be performed using water, filtrate, air or ultrasonics.

Accordingly, in accordance with the present invention, the purifying device for sludge under water and the method for operating the same can achieve the following objectives of enhanced life spans of parts, easy detachment under water and maintenance, enhanced filter efficiency due to easy expansion of the number of the filters, and perfect movability. Accordingly, the present invention meets industrial applicability, novelty and inventive steps.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A purifying device for sludge underwater, comprising:
a substantially rectangular frame having open sides;
a hollow liquid container at a lowermost portion of said substantially rectangular frame;
at least one filter within said substantially rectangular frame, said filter having a filtrate discharging hole in fluid communication with a liquid flow hole and a backwash hole of the hollow liquid container; and
a pump mounted on an upper portion of said substantially rectangular frame, and having an inlet connected to the liquid flow hole of the hollow liquid container through a liquid pipeline such that a negative pressure is created within said hollow liquid container thereby causing filtrate to be drawn through an outer surface of the filter and through the filtrate discharging hole;
wherein, while said purifying device is under water, water to be filtered enters an interior portion of said substantially rectangular frame through said open sides, where it is then drawn through said at least one filter due to the negative pressure created by said pump and the hydraulic pressure of the area, thereby causing solid particles to be retained by said at least one filter.

2. A purifying device according to claim 1, further comprising multiple slings affixed to side flanges of said substantially rectangular frame for suspending said substantially rectangular frame.

3. A purifying device according to claim 1, further comprising a backwash pipe connected to said backwash hole for the introduction of a fluid into the hollow liquid container.

4. A purifying device according to claim 1, further comprising a plurality of filters mounted within said substantially rectangular frame.

* * * * *